United States Patent [19]
Abdul-Raheem

[11] Patent Number: 5,937,570
[45] Date of Patent: Aug. 17, 1999

[54] DEVICE FOR CONNECTING A FISHING LINE TO FISHING ACCESSORIES

[75] Inventor: Qaiyim Abdul-Raheem, Newalla, Okla.

[73] Assignee: H.A.L.A.Q. Inc., Newalla, Okla.

[21] Appl. No.: 08/789,234

[22] Filed: Jan. 28, 1997

Related U.S. Application Data

[63] Continuation-in-part of application No. 08/438,462, May 10, 1995, Pat. No. 5,603,181, which is a continuation-in-part of application No. 08/229,259, Apr. 18, 1994, abandoned.

[51] Int. Cl.$^6$ ............................ A01K 91/03; A01K 91/04
[52] U.S. Cl. ............................................................ 43/44.92
[58] Field of Search ........................... 43/44.83, 43.16, 43/43.13, 42.19, 44.92

[56] References Cited

U.S. PATENT DOCUMENTS

| | | | |
|---|---|---|---|
| 451,341 | 4/1891 | Stukes | 43/44.83 X |
| 516,185 | 3/1894 | Carver . | |
| 1,728,560 | 9/1929 | Goshorn | 43/44.83 X |
| 2,216,487 | 10/1940 | Domagala | 43/28 |
| 2,570,468 | 10/1951 | Matthes | 43/43.16 X |
| 2,938,296 | 5/1960 | Kracht | 43/43.16 |
| 3,785,011 | 1/1974 | Marks | 24/115 |
| 4,718,191 | 1/1988 | Gentry | 43/42.13 |
| 4,905,403 | 3/1990 | Manno | 43/43.16 |
| 5,009,025 | 4/1991 | Austad | 43/44.83 |
| 5,113,616 | 5/1992 | McManus | 43/44.83 |
| 5,181,337 | 1/1993 | DuBois | 43/44.83 |

*Primary Examiner*—Joseph J. Hail, III
*Assistant Examiner*—Anthony Ojini
*Attorney, Agent, or Firm*—Dunlap, Codding & Rogers, P.C.

[57] ABSTRACT

A device and method for connecting a line to a spinnerbait type fishing lure having an R-shaped shank without requiring formation of a knot in the line is provided. The device includes a coil having at least 1½ turns and defining a shank receiving passageway. A first shank extends from one end of the coil, and a second shank extends from the other end of the coil. The first and second shanks extend from the coil so that the second shank is disposed at an angular relationship relative to the first shank whereby the first shank is biased away from the second shank when the first shank is drawn toward the second shank. The device further includes a line engaging hook formed on the first shank, and a line retaining loop formed on the second shank so as to be disposed a distance from the line engaging hook.

15 Claims, 7 Drawing Sheets

DEVICE FOR CONNECTING A FISHING LINE TO FISHING ACCESSORIES

CROSS-REFERENCE TO RELATED APPLICATIONS

This application is a continuation-in-part of U.S. Ser. No. 08/438,462, filed May 10, 1995, now U.S. Pat. No. 5,603,181, entitled DEVICE FOR CONNECTING A FISHING LINE TO FISHING ACCESSORIES, which is a continuation-in-part of U.S. Ser. No. 08/229,259, filed Apr. 18, 1994, entitled DEVICE FOR CONNECTING A FISHING LINE TO FISHING ACCESSORIES, now abandoned.

STATEMENT REGARDING FEDERALLY SPONSORED RESEARCH OR DEVELOPMENT

Not applicable.

BACKGROUND OF THE INVENTION

1. Field of the Invention

The present invention relates generally to connecting devices for securing a line to an object, and more particularly, but not by way of limitation, to a connecting device for connecting a fishing line to a fishing accessory without requiring formation of a knot in the fishing line.

2. Brief Description of the Related Art

Fishermen frequently change baits in order to determine a bait that will attract fish. It is customary for such fishermen to tie a knot in the fishing line in order to secure the bait to the fishing line. However, the tying of knots in the fishing line can be difficult for young children, physically impaired persons, persons with arthritis or in dark and inclement weather conditions. Thus, it would be desirable if a device could be provided which would permit fishermen to quickly and easily connect a bait to a fishing line without requiring the tying of a knot in the fishing line.

BRIEF SUMMARY OF THE INVENTION

The present invention is directed to a device for connecting a line to a fishing lure having an R-shaped shank. The device comprising a coil having at least about 1½ turns and defining a shank receiving passageway, a first shank extending from one end of the coil, and a second shank extending from the other end of the coil and having a length greater than the length of the first shank. The first and second shanks extend from the coil so that the second shank is angularly disposed relative to the first shank whereby the first shank is biased away from the second shank when the first shank is drawn toward the second shank. A line engaging hook formed on an end of the first shank, and a line retaining loop formed on an end of the second shank so as to be disposed a distance from the line engaging hook.

In another aspect, the present invention is directed to a method for securing a fishing lure having an R-shaped shank to a fishing line without requiring formation of a knot in the line. The method includes the steps of securing the connecting device to the shank of the lure so that the shank of the lure extends through the shank receiving passageway of the connecting device. A loop is then formed in the line such that a distal end portion of the line is disposed substantially adjacent a portion of the line for a selected distance. The loop is positioned over the line engaging hook formed on the end of the first shank, and the line is pulled so as to draw the first shank toward the second shank. The line is then wrapped about the second shank a plurality of times, and drawn into the line retaining loop thereby securing the fishing lure to the line without requiring a knot to be formed in the line.

The objects, features and advantages of the present invention will become apparent from the following detailed description when read in conjunction with the accompanying drawings and appended claims.

DETAILED DESCRIPTION OF THE INVENTION

The term "fishing accessory" as used herein is to be understood to mean any object which a fisherman may desire to secure to a fishing line, such as a lure, a hook, a swivel and the like.

Figure 1:
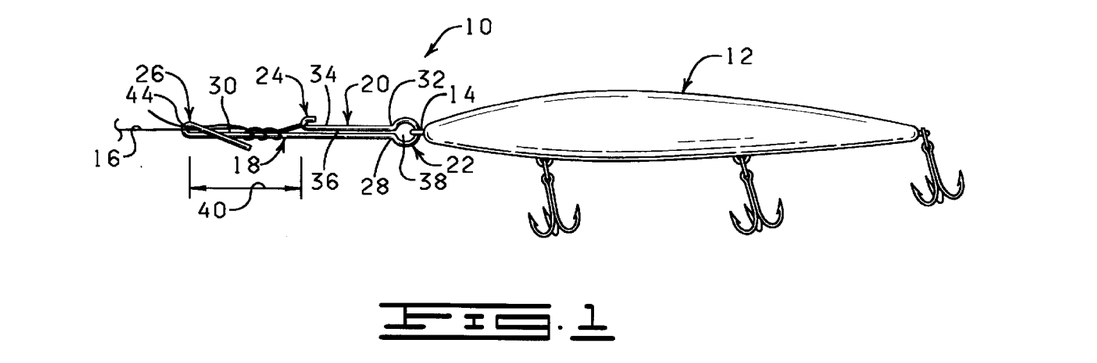
FIG. 1 is an elevational view illustrating the connection of a fishing line to a fishing lure employing a connecting device constructed in accordance with the present invention.

Referring now to the drawings, and more particularly to FIG. 1, a connecting device 10 constructed in accordance with the present invention is shown connecting a lure 12 having a connecting eyelet 14 to a fishing line 16. As will be more fully described hereinafter, the connecting device 10 permits fishermen to connect the lure 12 to the fishing line 16 without requiring a knot to be formed in the fishing line 16.

Figures 2, 3, 4:
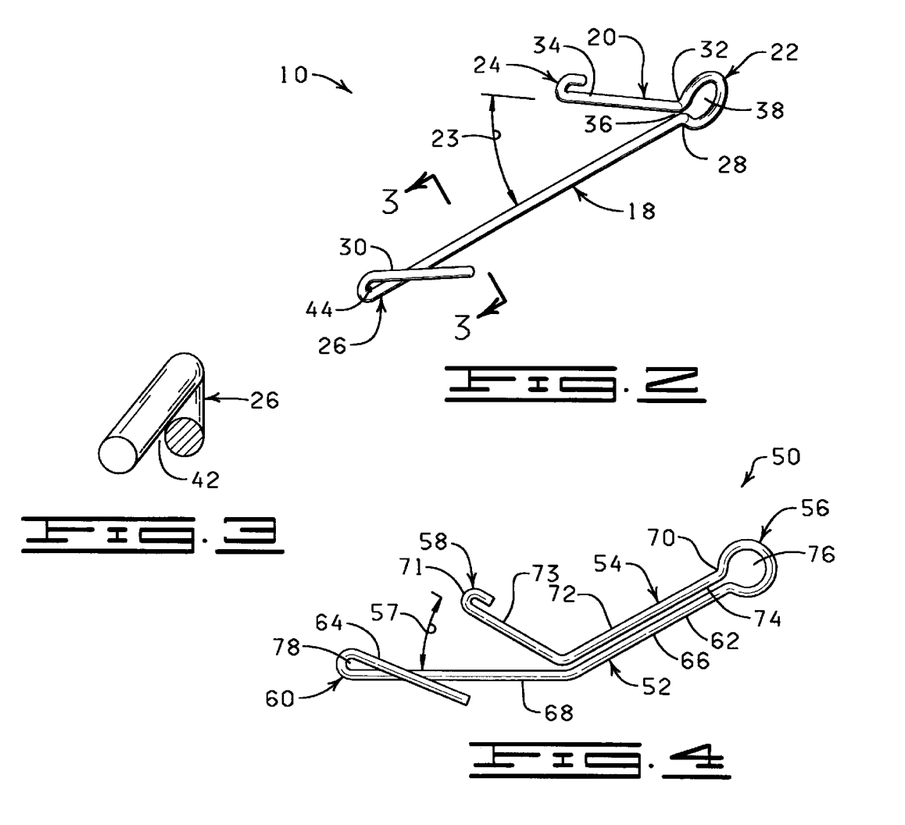
FIG. 2 is a perspective view of the connecting device of the present invention.
FIG. 3 is a cross-sectional view of the connecting device of FIG. 2 taken along 3—3.
FIG. 4 is an elevational view of another embodiment of a connecting device constructed in accordance with the present invention.

Referring now to FIGS. 1–3, the connecting device 10 is provided with a first shank 18, a second shank 20, an eyelet member 22, a line engaging hook 24 and a line retaining loop 26. The first shank 18 is characterized as having a first end 28 and a second end 30; and the second shank 20 is also characterized as having a first end 32 and a second end 34. The first ends 28, 32 of the first and second shanks 18, 20 are connected to the eyelet member 22 so that the first and second shanks 18, 20 extend from the eyelet member 22 in a substantially biased, angularly offset relationship (shown in FIG. 2 as angle 23) and define a passageway 36 therebetween which openly communicates with a cavity 38 of the eyelet member 22.

The first shank 18 is angularly offset at the angle 23 from the second shank 20 in order to impart a springlike resistance to the first shank 18 and the second shank 20. As will be explained below, the springlike resistance imparted to the first and second shanks 18 and 20 assists in securing the fishing line 16 to the device 10, and further assists in releasing the fishing line 16 from the device 10. The angle 23 is any angle sufficient to impart the springlike resistance to the first and second shanks 18 and 20.

The second end 34 of the second shank 20 terminates a distance 40 from the second end 30 of the first shank 18. The distance 40 between the second ends 30, 34 of the first and second shanks 18, 20 can vary widely provided the distance 40 is sufficient to permit the fishing line 16 to be wrapped about the first shank 18 when the fishing line 16 is connected to the device 10 substantially as shown in FIG. 1.

The line engaging hook 24 is provided with a substantially C-shaped configuration and is connected to the second end 34 of the second shank 20 so as to extend therefrom in a direction away from the first shank 18 substantially as shown; and the line retaining loop 26 is connected to the second end 30 of the first shank 18. The line retaining loop 26 defines a line receiving passageway 42 (FIG. 3) which openly communicates with a line receiving cavity 44 of the line retaining loop 26. Thus, the line engaging hook 24 cooperates with the first shank 18 and the line retaining loop 26 to secure the fishing line 16 to a fishing accessory, such as lure 12.

The length of the first and second shanks 18, 20 of the connecting device 10 can vary widely provided that the length of the first shank 18 is sufficiently longer than the length of the second shank 20 so as to permit the fishing line to be wrapped about a portion of the first shank when connecting the fishing line to the connecting device 10. However, for fresh water fishing, desirable results can be obtained when the first shank 18 is provided with a length of from about 0.4 to about 800 mm and the second shank 20 is provided with a length of from about 0.2 to about 400 mm.

Referring now to FIG. 4, a connecting device 50 constructed in accordance with the present invention is illustrated. The connecting device 50 is provided with a first shank 52, a second shank 54, an eyelet member 56, a line engaging hook 58 and a line retaining loop 60. The first shank 52 is provided with a first end 62, a second end 64 and first and second medial portions 66, 68 disposed therebetween. The second medial portion 68 of the first shank 52 extends from the first medial portion 66 so that an obtuse angle is formed therebetween.

The second shank 54 has a first end 70, a second end 71, and first and second medial portions 72 and 73. The second medial portion 73 extends from the first medial portion 72 so that an obtuse angle is formed therebetween. The first ends 62, 70 of the first and second shanks 52, 54 are connected to the eyelet member 56 so that the first medial portion 66 of the first shank 52 and the first medial portion 72 of the second shank 54 extend from the eyelet member 56 in a substantially parallel relationship and define a passageway 74 therebetween which openly communicates with a cavity 76 of the eyelet member 56. The second medial portion 68 of the first shank 52 is angularly offset at the angle 57 from the second medial portion 73 of the second shank 54 in order to impart a springlike resistance to the first shank 52 and the second shank 54. The angle 57 is any angle sufficient to impart the springlike resistance to the first and second shanks 52 and 54.

The line engaging hook 58 is provided with a substantially C-shaped configuration and is connected to the second end 71 of the second shank 54 so as to extend therefrom in a direction away from the first and second medial portions 66, 68 of the first shank 52 substantially as shown; and the line retaining loop 60 is connected to the second end 64 of the first shank 52. The line retaining loop 60 is identical in construction and function as the line retaining loop 26 of the connecting device 10 heretofore described with reference to FIGS. 1–3. That is, the line retaining loop 60 defines a line receiving passageway (not shown) which openly communicates with a line receiving cavity 78 of the line retaining loop 60. Thus, the line engaging hook 58 cooperates with the second medial portion 68 of the first shank 52 and the line retaining loop 60 to secure the fishing line to a fishing accessory.

The connecting devices 10 and 50 are desirably of unitary construction and are fabricated of a material having sufficient strength so as to maintain the configuration and integrity of the connecting devices 10 and 50 under normal conditions encountered by fishermen using such devices to connect a fishing line to a fishing accessory. Additionally, the material must be capable of exhibiting springlike resistance when the devices 10 and 50 are constructed as previously described. Examples of material which cap be employed in the fabrication of the connecting devices 10 and 50 are steel and plastic wire.

The size of the material employed in the fabrication of the connecting devices 10 and 50 can also vary widely and will generally be dependent upon the species of fish being sought and the weight of the fishing line. However, for most fresh water fishing desirable results can be obtained wherein the material has a gauge thickness of from about 0.01 to about 1 cm.

The procedure for connecting a fishing accessory to a fishing line employing the connecting device 10 is substantially identical to the procedure for connecting a fishing accessory to a fishing line using the connecting device 50. Thus, only the connection of a fishing accessory, such as the lure 12, to the fishing line 16 employing the connecting device 10 will be described.

When employing the connecting device 10 to connect the lure 12 to the fishing line 16, the fishing lure 12 is initially connected to the connecting device 10 by positioning the line engaging hook 24 of the connecting device 10 through the connecting eyelet 14 of the lure 12 and sliding the connecting eyelet 14 of the lure 12 through the passageway 36 defined between the first and second shanks 18, 20 of the connecting device 10 until the connecting eyelet 14 of the lure 12 connectingly engages the eyelet member 22 of the connecting device 10. Once the lure 12 has been connected to the connecting device 10, the fishing line 16 is then connected to the connecting device 10 through a sequence of steps illustrated in FIGS. 5–8.

Figure 5:
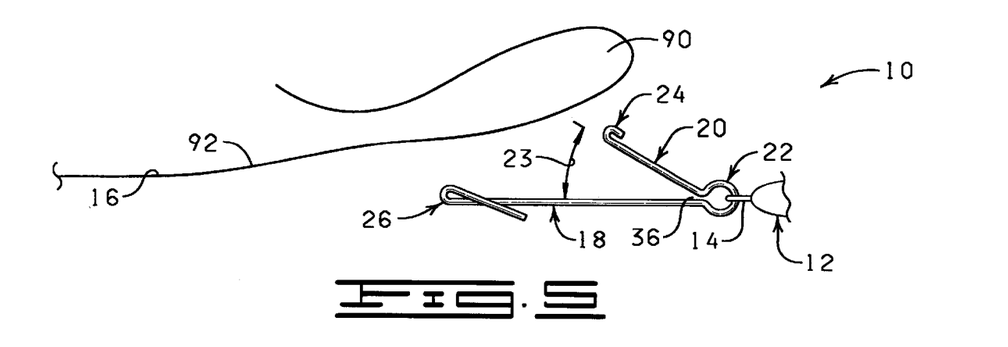
FIGS. 5–8 are elevational views of a fishing line and the connecting device of FIG. 1 illustrating the procedure for connecting the fishing line to the connecting device.
Figure 6:
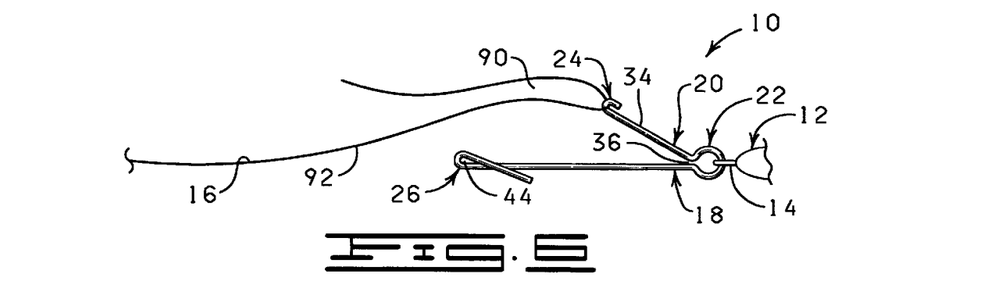
Figure 7:
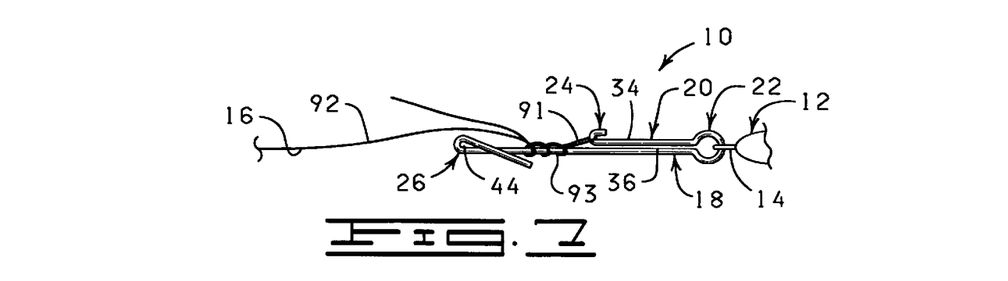

To connect the fishing line 16 to the connecting device 10, a loop 90 is formed in a distal end portion 92 of the fishing line 16 (FIG. 5). The loop 90 is then positioned over the line engaging hook 24 formed on the second end 34 of the second shank 20 (FIG. 6). The fishing line 16 and the adjacently disposed distal end portion 92 thereof, which cooperate to form the loop 90, are then wrapped around the first shank 18 of the connecting device 10 so as to provide a plurality of turns 93 of the fishing line 16 on the first shank 18 of the connecting device 10 (FIG. 7). The number of the turns 93 of the fishing line 16 on the first shank 18 can vary but will desirably be at least two, and more desirably from about 4 to about 7.

Figure 8:
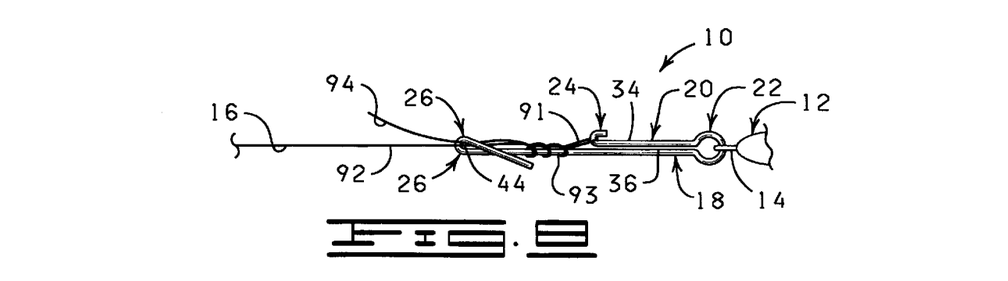

When the first of the turns 93 is wrapped around the first shank 18 of the connecting device 10, the distal end portion 92 of line 16 is pulled taut, thereby drawing the second shank 20 toward the first shank 18 until the first shank 18 and the second shank 20 are disposed in a substantially parallel position, as shown in FIGS. 7 and 8. When the first and second shanks 18 and 20 are spatially disposed in the substantially parallel position, the springlike resistance of the first and second shanks 18 and 20 acts to maintain a portion 91 of the distal end portion 92 of the line 16 in a tensioned state. The tensioned state of the portion 91 of the line 16 assists in maintaining the attachment of the line 16 to the device 10 when the line 16 and the device 10 are subject to perturbation, as when the line 16 and the device 10 are pulled through air or water, or when the line 16 and device 10 are subjected to shocks and twisting movement caused by a fish striking the lure 12, or being hooked thereby.

After the fishing line 16 and the adjacently disposed distal end portion 92 of the fishing line 16 have been wrapped around the first shank 18 of the connecting device 10, the fishing line 16 and the distal end portion 92 are drawn or caused to pass through the line retaining loop 26 via the line receiving passageway 42 (FIG. 3) and the line receiving cavity 44 of the line retaining loop 26 (FIG. 8) and thereby connect the fishing line 16 to the lure 12 without requiring the formation of a knot in the fishing line 16. If desired, a pigtail 94 formed by the remainder of the distal end portion 92 of the fishing line 16 can be cut off in a customary manner.

When the line 16 is released from the device 10, the turns 93 are unwrapped from the first shank 18, thereby releasing tension from the portion 91 of the distal end portion 92 of the line 16. The release of tension on the portion 91 of the line 16 allows the springlike resistance of the first and second shanks 18 and 20 to return the second shank 20 to a substantially angularly offset position (approximately equivalent to angle 23, shown in FIG. 5), thereby assisting in the release of the loop 90 of the line 16 from the line engaging hook 24 formed on the second end 34 of the second shank 20.

Figure 9:
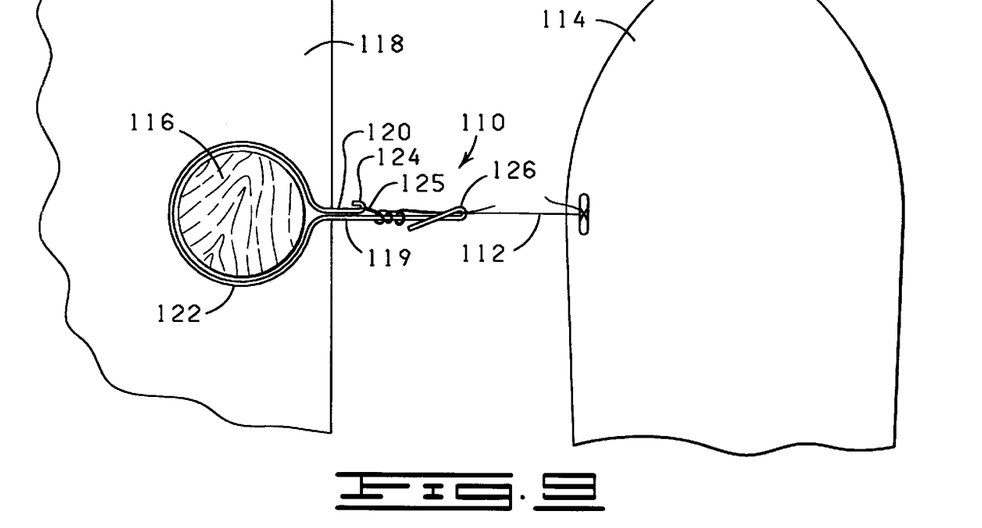
FIG. 9 is a top plan view of the connecting device of FIG. 1 wherein such connecting device is employed to secure a boat to a dock via a rope.

Referring now to FIG. 9, a connecting device 110 of the present invention is illustrated for connecting a mooring or docking line 112 of a boat 114 to a mooring post 116 of a dock 118. The connecting device 110 is substantially identical in construction as the connecting device 10 except that the connecting device 110 is constructed of heavier materials. That is, the connecting device 110 is provided with a first shank 119, a second shank 120, angularly disposed from the first shank 119, an eyelet member 122, a line engaging hook 124 and a line retaining loop 126. The eyelet member 122 is sized so as to be positionable over an object to which the boat 114 is to be tied, such as the mooring post 116. Since the connecting device 110 is substantially identical in construction as the connecting device 10, and the docking line 112 is connected to the connecting device 110 in the same manner as the fishing line 16 is connected to the connecting device 10, no further description of the connecting device 110 or its use in the securing of the boat 114 to the mooring post 116 of the dock 118 via the mooring line 112 is believed necessary to enable one skilled in the art to construct and use the connecting device 110.

Figure 10:
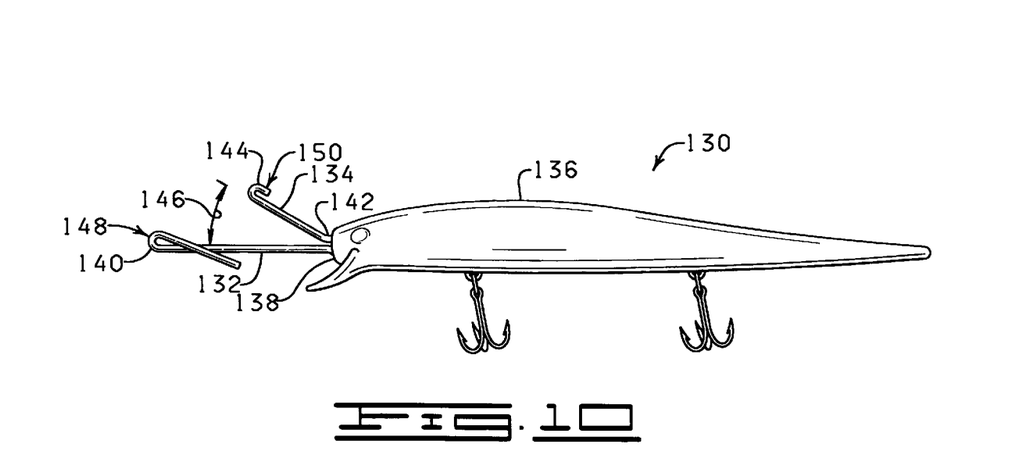
FIG. 10 is an elevational view of the connecting device of the present invention incorporated into a fishing lure.

Shown in FIG. 10 is a connecting device 130 constructed in accordance with the present invention and integrally formed with a fishing lure. The connecting device 130 is provided with a first shank 132, a second shank 134 and a fishing lure body 136. The first shank 132 has a first end 138 and a second end 140, the second end 140 being formed into a line retaining loop 148. The second shank 134 has a first end 142 and a second end 144, the second end 144 being formed into a line engaging hook 150.

The first end 138 of the first shank 132 and the first end 142 of the second shank 134 are connected to the fishing lure body 136 so that the first and second shanks 132 and 134 extend from the fishing lure body 136 in a substantially biased, angularly offset relationship (angle 146). The angle 146 is any angle sufficient to impart springlike resistance to the first and second shanks 132 and 134. Except as described above, the connecting device 130 is constructed and used in exactly the same manner as the connecting device 10 shown in FIGS. 1, 2 and 5–8.

The first end 138 of the first shank 132 and the first end 142 of the second shank 134 may be segmented (not shown) and affixed within the fishing lure body 136. Alternately, the first end 138 of the first shank 132 and the first end 142 of the second shank 134 can be connected to an eyelet (not shown) which, in turn, can be affixed within the fishing lure body 136.

Figure 11:
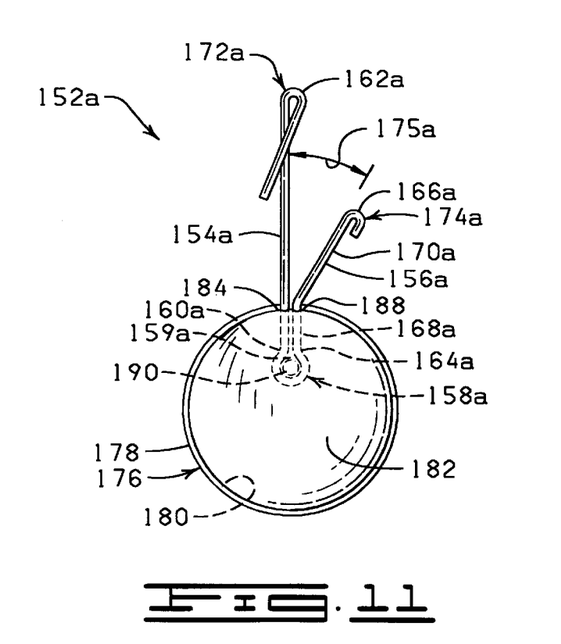
FIG. 11 is an elevational view of another embodiment of a connecting device constructed in accordance with the present invention, having a fishing float connected to one end thereof.

FIG. 11 shows a connecting device 152a constructed in accordance with the present invention. The connecting device 152a is provided with a first shank 154a, a second shank 156a and an eyelet member 158a. The eyelet member 158a defines a receiving cavity 159a.

The first shank 154a has a first end 160a and a second end 162a, the second end 162a being formed into a line retaining loop 172a. The second shank 156a has a first end 164a, a second end 166a, and first and second medial portions 168a and 170a disposed therebetween. The second end 166a of the second shank 156a is formed into a line engaging hook 174a.

The first end 160a of the first shank 154a and the first end 164a of the second shank 156a are connected to the eyelet member 158a so that a part of the first shank 154a and the first medial portion 168a of the second shank 156a extend from the eyelet member 158a in a substantially parallel relationship. The second medial portion 170a of the second shank 156a extends from the first medial portion 168a so that an obtuse angle is formed therebetween, and so that the second medial portion 170a is substantially biased and angularly offset (angle 175a) from a part of the first shank 154a. The angle 175a is any angle sufficient to impart springlike resistance to the first and second shanks 154a and 156a.

The device 152a is connected to a fishing float or bobber 176. The bobber 176 has an outer peripheral sidewall 178 having an inner surface 180 defining a flotation cavity 182. The bobber 176 is constructed of any suitable material. One example of suitable material is molded styrene plastic. First and second apertures 184, 188 extend through the sidewall 178, allowing communication with the flotation cavity 182 of the bobber 176. A pin 190 is connected to portions of the inner surface 180 of the sidewall 178. The pin 190 at least partially fits within the receiving cavity 159a of the eyelet member 158a of the device 152a.

A part of the first shank 154a of the device 152a extends through the first aperture 184 of the sidewall 178. A part of the first medial portion 168a of the second shank 156a extends through the second aperture 188 of the sidewall 178 of the bobber 176. The first and second apertures 184 and 188 are thereafter sealed to render the flotation cavity 182 substantially watertight. Except as described above, the connecting device 152a is constructed and used in exactly the same manner as the connecting device 10 shown in FIGS. 1 and 2.

Figure 12:
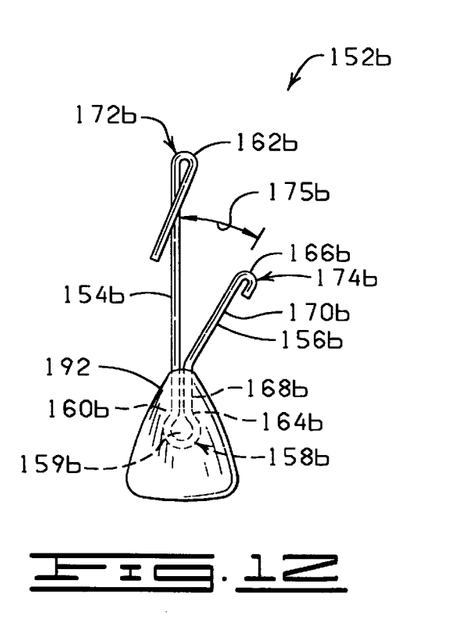
FIG. 12 is an elevational view of the connecting device of FIG. 11 having a fishing weight connected to one end thereof.

FIG. 12 shows a connecting device 152b constructed in accordance with the present invention. The connecting device 152b is generally similar in construction to the connecting device 152a shown in FIG. 11. The connecting device 152b is provided with a first shank 154b, a second shank 156b and an eyelet member 158b. The eyelet member 158b defines a receiving cavity 159b.

The first shank 154b has a first end 160b and a second end 162b, the second end 162b being formed into a line retaining loop 172b. The second shank 156b has a first end 164b, a second end 166b, and first and second medial portions 168b, 170b disposed therebetween. The second end 166b of the second shank 156b is formed into a line engaging hook 174b.

The first end 160b of the first shank 154b and the first end 164b of the second shank 156b are connected to the eyelet member 158b so that a part of the first shank 154b and the first medial portion 168b of the second shank 156b extend from the eyelet member 158b in a substantially parallel relationship. The second medial portion 170b of the second shank 156b extends from the first medial portion 168b so that an obtuse angle is formed therebetween, and so that the second medial portion 170b is substantially biased and angularly offset (angle 175b) from a part of the first shank 154b. The angle 175b is any angle sufficient to impart springlike resistance to the first and second shanks 154b and 156b.

The device 152b is attached to a fishing weight 192. The fishing weight 192 is typically constructed of lead, but any suitable material may be used. The fishing weight 192 is formed or cast about the eyelet member 158b, a part of the first shank 154b and a part of the first medial portion 168b of the second shank 156b of the device 152b. Except as described above, the connecting device 152b is constructed and used in exactly the same manner as the connecting device 10 shown in FIGS. 1 and 2.

Figure 13:
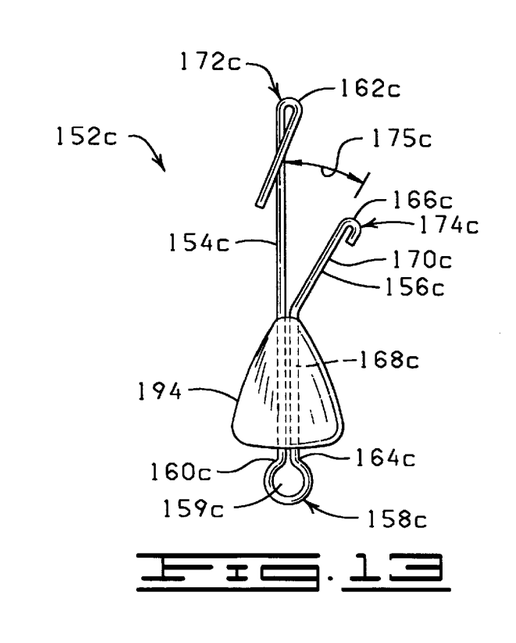
FIG. 13 is an elevational view of another embodiment of a connecting device constructed in accordance with the present invention having a fishing weight disposed thereon.

FIG. 13 shows a connecting device 152c constructed in accordance with the present invention. The connecting device 152c is generally similar in construction to the connecting device 152a shown in FIG. 11. The connecting device 152c is provided with a first shank 154c, a second shank 156c and an eyelet member 158c. The eyelet member 158c defines a receiving cavity 159c.

The first shank 154c has a first end 160c and a second end 162c, the second end 162c being formed into a line retaining loop 172c. The second shank 156c has a first end 164c, a second end 166c, and first and second medial portions 168c, 170c disposed therebetween. The second end 166c of the second shank 156c is formed into a line engaging hook 174c.

The first end 160c of the first shank 154c and the first end 164c of the second shank 156c are connected to the eyelet member 158c so that a portion of the first shank 154c and the first medial portion 168c of the second shank 156c extend from the eyelet member 158c in a substantially parallel relationship. The second medial portion 170c of the second shank 156c extends from the first medial portion 168c so that an obtuse angle is formed therebetween, and so that the second medial portion 170c is substantially biased and angularly offset (angle 175c) from a part of the first shank 154c. The angle 175c is any angle sufficient to impart springlike resistance to the first and second shanks 154c and 156c.

The device 152c is attached to a fishing weight 194. The fishing weight 194 is typically constructed of lead, but any suitable material may be used. The fishing weight 194 is formed or cast about a part of the first shank 154c and a part of the first medial portion 168c of the second shank 156c of the device 152c. Except as described above, the connecting device 152c is constructed and used in exactly the same manner as the connecting device 10 shown in FIGS. 1 and 2.

Figure 14:
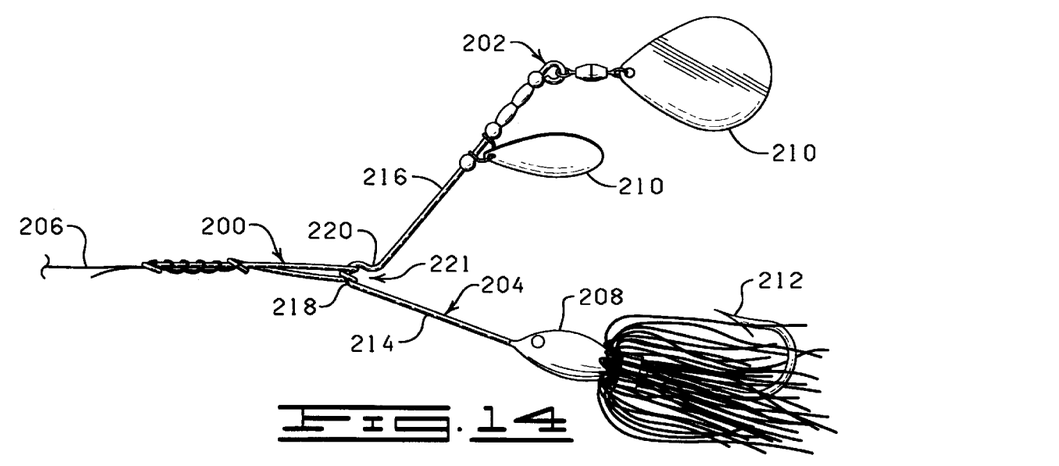
FIG. 14 is a plan view of a connecting device constructed in accordance with the present invention shown connecting a fishing line to a spinnerbait.

FIG. 14 shows another embodiment of a connecting device 200 constructed in accordance with the present invention. The connecting device 200 is adapted for connecting a lure 202 of the type that has an arcuate, or more specifically R-shaped, shank 204 to a fishing line 206. The lure 202, commonly known as a "spinnerbait", includes a head 208 connected to one end of the shank 204 and a plurality of metal blades 210 rotatably connected to the other end of the shank 204. The head 208 is provided with a hook 212, and the blades 210 are adapted to rotate as the lure 202 is drawn through a body of water.

The shank 204 includes a first linear portion 214 and a second linear portion 216. The first linear portion 214 is connected to the head 208 of the lure 202 so that the first linear portion 214 and the head 208 are substantially aligned in an axial relationship. The second linear portion 216 is angularly disposed relative to the first linear portion 214. More particularly, the second linear portion 216 is connected to the first linear portion 214 via a first bend 218 and a second bend 220. The first bend 218 has a substantially U-shaped configuration, and the angle of the first bend 218 is approximately 180 degrees. The second bend 220 is directed away from the first linear portion 214 and the angle of the second bend 220 is in a range from about 100 degrees to about 120 degrees. As shown, the first linear portion 214, the first bend 218, and the second bend 220 cooperate to define a closed neck 221 for receiving the fishing line 206 or a swivel (not shown).

In normal use, the shank 204 of the lure 202 is connected indirectly to a fishing line via a swivel (not shown) or directly to the fishing line 206 by tying the fishing line 206 to the shank 204. The lure 202 is designed to operate with the fishing line 206 or swivel disposed in the closed neck 221 whereby the weight of the head 208 causes the head 208 to travel behind the fishing line 206 in a substantially axial relationship therewith. Because the metal blades 210 weigh less than the head 208, the second linear portion 216 extends angularly outward with the blades 210 being caused to rotate as the lure 202 is drawn through a body of water.

While lures of the type described immediately above are widely used and can be effective for attracting fish, a problem experienced by fishermen who use such lures is that the swivel or the fishing line can occasionally slip around the second bend 220 and down the second linear portion 216 of the shank 204 during the casting of the lure 202. Upon drawing the lure 202 through the water, the swivel or fishing line may slide back around the second bend 220 and into the neck 221 whereby the lure 202 operates as designed. However, the swivel or fishing line may remain disposed on the second linear portion 216 near the blades 210 of the lure 202. In this instance, the lure 202 is unbalanced as it is pulled through the water and thus ineffective. The connecting device 200 illustrated in FIGS. 14–18 reduces the opportunity for the fishing line 206 to slide around the second bend 220 and thus reduces the number of times the lure 202 will operate improperly. In addition, the connecting device 200 permits fishermen to quickly and easily connect a lure to a fishing line without requiring the tying of a knot in the fishing line.

Figure 15:
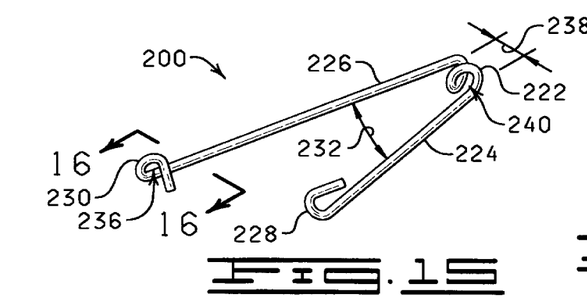
FIG. 15 is perspective view of the connecting device of FIG. 14.
Figure 16:
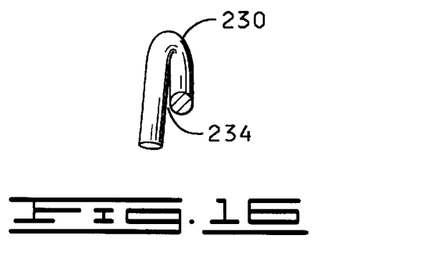
FIG. 16 is a cross-sectional view of the connecting device of the present invention taken along 16—16 of FIG. 15.

Referring now to FIGS. 14–15, the connecting device 200 is fabricated from a steel or plastic wire that is shaped to form a coil 222 with a first shank 224 and a second shank 226 extending from the coil 222. The first shank 224 is provided with a line engaging hook 228, and the second shank 226 is provided with a line retaining loop 230. The first and second shanks 224, 226 extend from the coil 222 so that the first and second shanks 224, 226 are disposed in a substantially angular relationship relative to one another (shown in FIG. 14 as angle 232).

The first shank 224 is angularly offset from the second shank 226 at the angle 232 in order to provide a springlike resistance to the first shank 224 and the second shank 226. In the manner described above in reference to the connecting device 10, the springlike resistance between the first and second shanks 224 and 226 assists in securing the fishing line 206 to the connecting device 200, and further assists in releasing the fishing line 206 from the connecting device 200.

The line engaging hook 228 has a substantially C-shaped configuration and is formed so as to extend toward the second shank 226 substantially as shown. The line retaining loop 230 is formed to provide a line receiving passageway 234 (FIG. 16) that openly communicates with a line receiving cavity 236 of the line retaining loop 230. The line engaging hook 228 cooperates with the second shank 226 and the line retaining loop 230 to secure the fishing line 206 to the lure 202 in a manner to be described below.

The length of the first and second shanks 224, 226 of the connecting device 200 can vary widely provided that the length of the second shank 226 is sufficiently longer than the length of the first shank 224 so as to permit the fishing line 206 to be wrapped about a portion of the second shank 226 when connecting the fishing line 206 to the connecting device 200.

The coil 222 has approximately 1½ turns and is characterized as having a width 238 and a shank receiving passageway 240 in which the shank 204 of the lure 202 is disposed when the connecting device 200 is installed on the lure 202. The coil 222 is wound so that the shank 204 of the lure 202 is laterally positionable between the turns of the coil 222 whereby the connecting device 200 can be screwed about the shank 204 of the lure 202 in a manner to be described in more detail below. The width 238 of the coil 222 is dimensioned such that the coil 222 is disposable in the neck 221 of the lure 202 while at the same time impeding the connecting device 200 from passing around the second bend 220 of the lure 202 when the connecting device 200 is installed on the shank 204 of the lure 202.

Figure 17A:
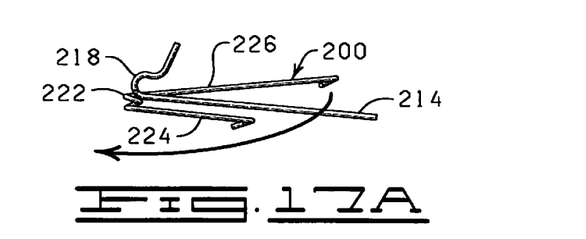
FIGS. 17A–17D illustrate the sequence for installing the connecting device of FIG. 14 onto the spinnerbait.
Figure 17B:
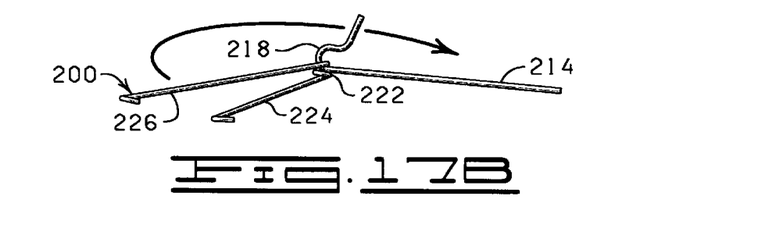
Figure 17C:
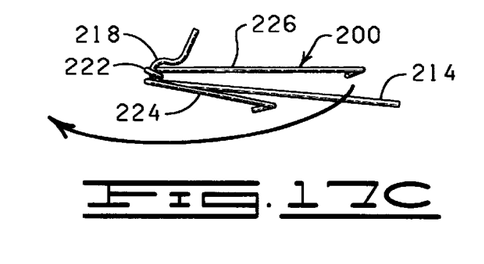
Figure 17D:
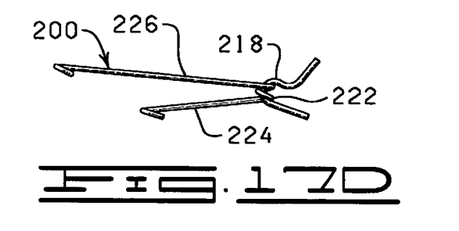

When employing the connecting device 10, the connecting device 200 is first installed on the shank 204 of the lure 202. FIGS. 17A–17D illustrate the sequence of steps for installing the connecting device 200 on the shank 204 of the lure 202. As shown in FIG. 17A, the connecting device 200 is first positioned relative to the shank 204 of the lure 202 so that the coil 222 is positioned adjacent to the first bend 218 with the shank 204 of the lure 202 disposed between the second shank 226 of the connecting device 200 and the coil 222. The connecting device 200 is then rotated forward about the first bend 218 (FIG. 17B) with the shank 204 of the lure 202 remaining disposed between the second shank 226 and the coil 222. The connecting device 200 is rotated approximately 1½ revolutions so as to screw the connecting device 200 onto the shank 204 of the lure 202 until the shank 204 of the lure 202 extends through the shank receiving passageway 240 of the coil 222 as shown in FIGS. 17C and 17D. The connecting device 200 is removed from the shank 204 of the lure 202 by reversing the sequence described above.

With the connecting device 200 installed on the shank 204 of the lure 202, the fishing line 206 can then be connected to the connecting device 200. The fishing line 206 is connected to the connecting device 200 by a sequence of steps illustrated in FIGS. 18A–18F.

Figure 18A:
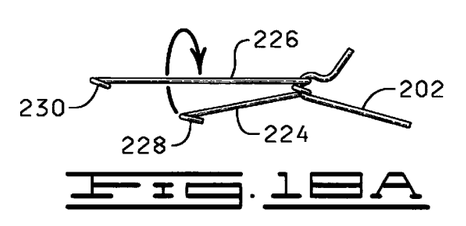
FIGS. 18A–18F illustrate the sequence for connecting the fishing line to the connecting device.
Figure 18B:
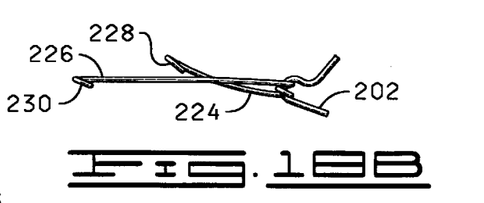
Figure 18C:
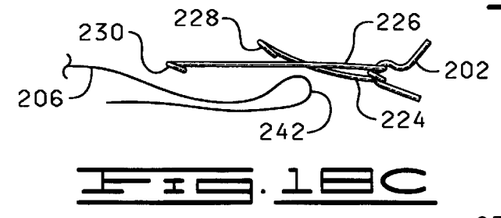
Figure 18D:
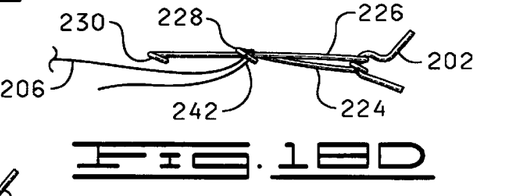
Figure 18E:
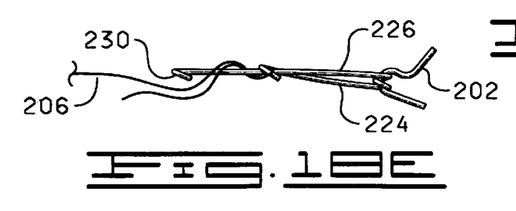
Figure 18F:
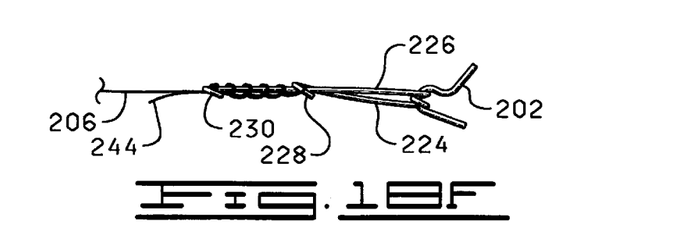

To connect the fishing line 206 to the connecting device 200, the first shank 224 is pressed toward the second shank 226 (FIG. 18A) until the line engaging hook 228 extends past the second shank 226 (FIG. 18B). A loop 242 formed in the end of the fishing line 206 (FIG. 18C) is then positioned over the line engaging hook 228 (FIG. 18D). The line engaging hook 228 is then hooked to the second shank 226 as shown in FIG. 18D. The portions of the fishing line 206 that cooperate to form the loop 242 are then wrapped around the second shank 226 of the connecting device 200 (FIG. 18E) several turns in a direction that will cause the line engaging hook 228 to be secured about the second shank 226. The number of the turns of the fishing line 206 on the second shank 226 can vary but will desirably be at least two, and more desirably from about four to about seven.

After the fishing line 206 has been wrapped around the second shank 226 of the connecting device 200, the fishing line 206 is drawn or caused to pass through the line retaining loop 230 via the line receiving passageway 234 (FIG. 16) and the line receiving cavity 236 of the line retaining loop 230. If desired, a pigtail 244 formed by the remainder of the distal end of the fishing line 206 can be cut off in a customary manner. The fishing line 206 is released from the connecting device 200 by reversing the sequence described above.

Figure 19:
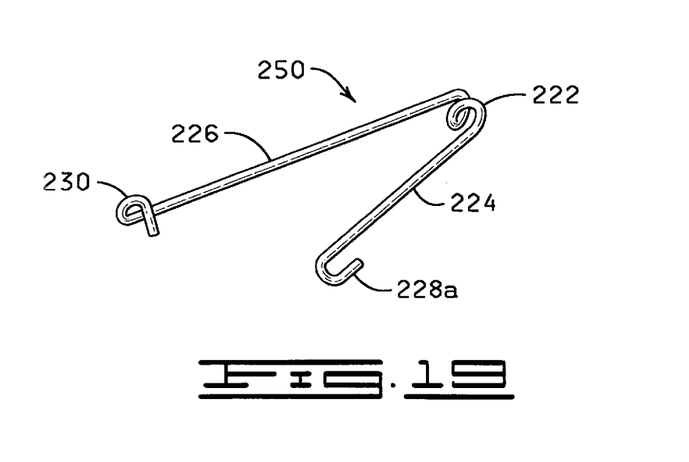
FIG. 19 is a perspective view of another connecting device constructed in accordance with the present invention.

FIG. 19 shows another embodiment of a connecting device 250 constructed in accordance with the present invention. The connecting device 250 is substantially identical in construction to the connecting device 200 with the exception that the connecting device 250 has a line engaging hook 228a formed so as to extend in a direction away from the second shank 226. To this end, it will be appreciated that the connecting device 250 is installed onto the is shank 204 of the lure 202 in a manner identical to that described above in reference to the connecting device 200. But, the fishing line 206 is secured to the connecting device 250 in a manner identical to that described above in reference to the connecting device 10.

Figure 20:
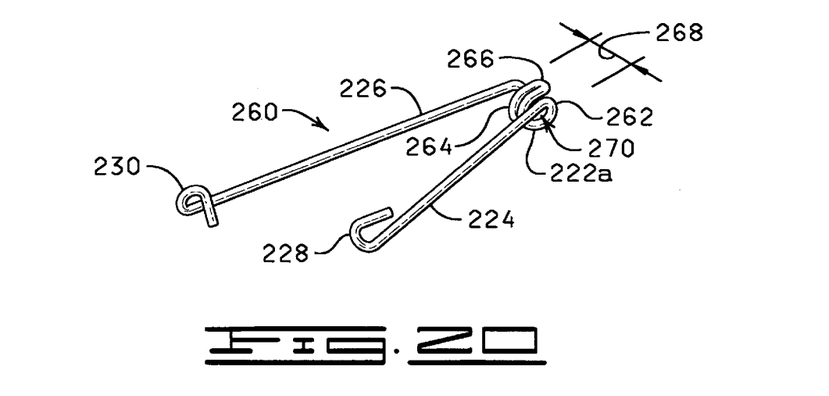
FIG. 20 is a perspective view of another connecting device constructed in accordance with the present invention.

FIG. 20 shows yet another embodiment of a connecting device 260 constructed in accordance with the present invention. The connecting device 260 is also similar in construction to the connecting device 200 with the exception that the connecting device 260 is provided with a modified coil 222a. More specifically, the coil 222a is formed of a first coil 262 having one turn and a second coil 264 having one turn. The first coil 262 and the second coil 264 are mirror images of one another and are joined by a U-shaped bend 266, which serves as a transition between the first coil 262 and the second coil 264. Like the coil 222 of the connecting device 200, the coil 222a of the connecting device 260 is characterized as having a width 268 and a shank receiving passageway 270.

Changes may be made in the construction and the operation of the various components, elements and assemblies described herein and changes may be made in the steps or the sequence of steps of the methods described herein without departing from the spirit and scope of the invention as defined in the following claims.

What is claimed:

1. A fishing assembly comprising:

a fishing lure having a head connected to one end of an arcuate shank and a blade connected to another end of the arcuate shank; and a connecting device connected to the arcuate shank of the fishing lure for connecting a line to the fishing lure, the connecting device comprising:

a coil having at least about 1½ turns and defining a shank receiving passageway dimensioned so that the arcuate shank of the fishing lure may pass through the shank receiving passageway of the coil while preventing passage of the head and the blade of the fishing lure therethrough, the coil positioned about the arcuate shank of the fishing lure so that the arcuate shank of the fishing lure is extended through the shank receiving passageway of the coil;

a first shank extending from one end of the coil;

a second shank extending from the other end of the coil and having a length greater than the length of the first shank, the first and second shanks extending from the coil in a spaced apart relationship such that the coil is positioned about the arcuate shank of the fishing lure by rotation of the coil onto the arcuate shank of the fishing lure until the arcuate shank of the fishing lure extends through the shank receiving passageway of the coil;

a line engaging hook formed on an end of the first shank; and a line retaining loop formed on an end of the second shank so as to be disposed a distance from the line engaging hook.

2. The fishing assembly of claim 1 wherein the line engaging hook is formed on the end of the first shank so as to extend in a direction toward the second shank so that the line engaging hook is interlockable with the second shank when the first shank is pressed toward the second shank.

3. The device of claim 1 wherein the line engaging hook is formed on the end of the first shank so as to extend in a direction away from the second shank.

4. The fishing assembly of claim 1 wherein the turns of the coil are spaced apart a distance sufficient to laterally receive the shank of the lure therebetween.

5. A fishing assembly comprising:

a fishing lure having a head connected to one end of an arcuate shank and a blade connected to another end of the arcuate shank; and a connecting device connected to the arcuate shank of the fishing lure for connecting a line to the fishing lure, the connecting device comprising:

a piece of wire bent to form a coil having at least about 1 ½ turns, the coil defining a shank receiving passageway dimensioned so that the arcuate shank of the fishing lure may pass through the shank receiving passageway of the coil while preventing passage of the head and the blade of the fishing lure therethrough, the coil positioned about the arcuate shank of the fishing lure so that the arcuate shank of the fishing lure is extended through the shank receiving passageway of the coil, the coil having a first shank extending from one end of the coil and a second shank extending from the other end of the coil, the second shank having a length greater than the length of the first shank, the first and second shanks extending from the coil in a spaced apart relationship such that the coil is positioned about the arcuate shank of the fishing lure by rotation of the coil onto the arcuate shank of the fishing lure until the arcuate shank of the fishing lure extends through the shank receiving passageway of the coil, the wire further bent to form a line engaging hook on one end of the first shank and a line retaining loop on one end of the second shank, the line retaining loop on the end of the second shank being disposed a distance from the line engaging hook.

6. The fishing assembly of claim 5 wherein the line engaging hook is formed on the end of the first shank so as to extend in a direction toward the second shank so that the line engaging hook is interlockable with the second shank when the first shank is pressed toward the second shank.

7. The device of claim 5 wherein the line engaging hook is formed on the end of the first shank so as to extend in a direction away from the second shank.

8. The fishing assembly of claim 5 wherein the turns of the coil are spaced apart a distance sufficient to laterally receive the shank of the lure therebetween.

9. A fishing assembly, comprising:

a fishing lure having an R-shaped shank with a head connected to one end of the shank and a plurality of metal blades connected to an opposing end of the shank, the shank including a first linear portion and a second linear portion with the first linear portion being connected to the head of the lure and the second linear portion angularly disposed relative to the first linear portion, the first linear portion joined with the second linear portion via a substantially U-shaped first bend and a second bend that is directed away from the first linear portion; and a connecting device connected to the shank of the lure for connecting a line to the fishing lure, the connecting device comprising:

a coil having at least about 1½ turns and defining a shank receiving passageway dimensioned so that the arcuate shank of the fishing lure may pass through the shank receiving passageway of the coil while preventing passage of the head and the blades of the fishing lure therethrough, the coil disposed about the shank of the lure so that the shank of the lure is extended through the shank receiving passageway;

a first shank extending from one end of the coil;

a second shank extending from the other end of the coil and having a length greater than the length of the first shank, the first and second shanks extending from the coil in a spaced apart relationship such that the coil is disposed about the arcuate shank of the fishing lure by rotation of the coil onto the arcuate shank of the fishing lure;

a line engaging hook formed on an end of the first shank; and a line retaining loop formed on an end of the second shank so as to be disposed a distance from the line engaging hook.

10. The device of claim 9 wherein the line engaging hook is formed on the end of the first shank so as to extend in a direction toward the second shank so that the line engaging hook is interlockable with the second shank when the first shank is pressed toward the second shank.

11. The device of claim 9 wherein the line engaging hook is formed on the end of the first shank so as to extend in a direction away from the second shank.

12. The device of claim 9 wherein the turns of the coil are spaced apart a distance sufficient to laterally receive the shank of the lure therebetween.

13. The device of claim 9 wherein the coil has a width which is sufficient to impede the connecting device from sliding freely around the second bend of the shank of the lure.

14. A method for securing a fishing line to a fishing lure of the type having a head connected to one end of an arcuate shank and a blade connected to another end of the arcuate shank without requiring formation of a knot in the line, the method comprising the steps of:

provinding a connecting device comprising:

a coil having at least about 1½ turns and defining a shank receiving passageway dimensioned so that the arcuate shank of the fishing lure may pass through the shank receiving passageway of the coil while preventing passage of the head and the blade of the fishing lure therethrough;

a first shank extending from one end of the coil;

a second shank extending from the other end of the coil and having a length greater than the length of the first shank, the first and second shanks extending from the coil in a spaced apart relationship such that the coil is positionable about the arcuate shank of the fishing lure by rotation of the coil onto the arcuate shank of the fishing lure until the arcuate shank of the fishing lure extends through the shank receiving passageway of the coil;

a line engaging hook formed on an end of the first shank; and a line retaining loop formed on an end of the second shank so as to be disposed a distance from the line engaging hook;

securing the connecting device to the arcuate shank of the fishing lure by rotating the coil onto the arcuate shank of the fishing lure until the arcuate shank of the fishing lure extends through the shank receiving passageway of the coil;

forming a loop in the line such that a distal end portion of the line is disposed substantially adjacent a portion of the line for a selected distance;

positioning the loop over the line engaging hook formed on the end of the first shank;

pulling the line so as to draw the first shank toward the second shank;

wrapping the line and the adjacently disposed end portion about the second shank a plurality of times; and drawing the line and the remainder of the adjacently disposed end portion of the line into the line retaining loop thereby securing the fishing lure to the line without requiring a knot to be formed in the line.

15. The method of claim 14 further comprising the steps of:

pressing the first shank toward the second shank so that the line engaging hook extends past the second shank prior to positioning the loop over the line engaging hook; and hooking the line engaging hook on the second shank subsequent to positioning the loop over the line engaging hook.

* * * * *